United States Patent
Nakazawa

(10) Patent No.: US 8,116,752 B2
(45) Date of Patent: Feb. 14, 2012

(54) METHOD AND APPARATUS FOR CONTROLLING A MOBILE PHONE DEVICE

(75) Inventor: Masashi Nakazawa, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 507 days.

(21) Appl. No.: 12/337,563

(22) Filed: Dec. 17, 2008

(65) Prior Publication Data

US 2009/0170493 A1 Jul. 2, 2009

(30) Foreign Application Priority Data

Dec. 27, 2007 (JP) ................... 2007-338305

(51) Int. Cl.
*H04M 11/00* (2006.01)

(52) U.S. Cl. .................... 455/418; 455/565; 455/564
(58) Field of Classification Search .............. 455/550.1, 455/418, 565, 564, 556.2, 407, 425, 521, 455/552.1
See application file for complete search history.

(56) References Cited

U.S. PATENT DOCUMENTS

| 7,069,044 B2 * | 6/2006 | Okada et al. ............. 455/556.1 |
| 7,570,922 B2 * | 8/2009 | Williams ................. 455/67.11 |
| 2004/0018857 A1 * | 1/2004 | Asokan et al. ............. 455/564 |
| 2007/0167147 A1 * | 7/2007 | Krasner et al. .......... 455/404.2 |

FOREIGN PATENT DOCUMENTS

JP 2002-057751 2/2002

* cited by examiner

*Primary Examiner* — Kamran Afshar
*Assistant Examiner* — Yousef Rod
(74) *Attorney, Agent, or Firm* — Morrison & Foerster LLP

(57) ABSTRACT

A method and apparatus for controlling operation of a communication device is provided. In one embodiment, a mobile phone device includes: a communication section configured to perform radio communication; an operation section including number keys and a call-initiating key; and a control section configured to activate, on the basis of an operation that is performed using the operation section, a call-initiating program or a non-call-initiating program, and depending on what operations are performed by a user using the operation section of the mobile phone device, determining whether to interrupt a currently activated program to initiate a predetermined call with increased ease of use and convenience to the user.

13 Claims, 7 Drawing Sheets

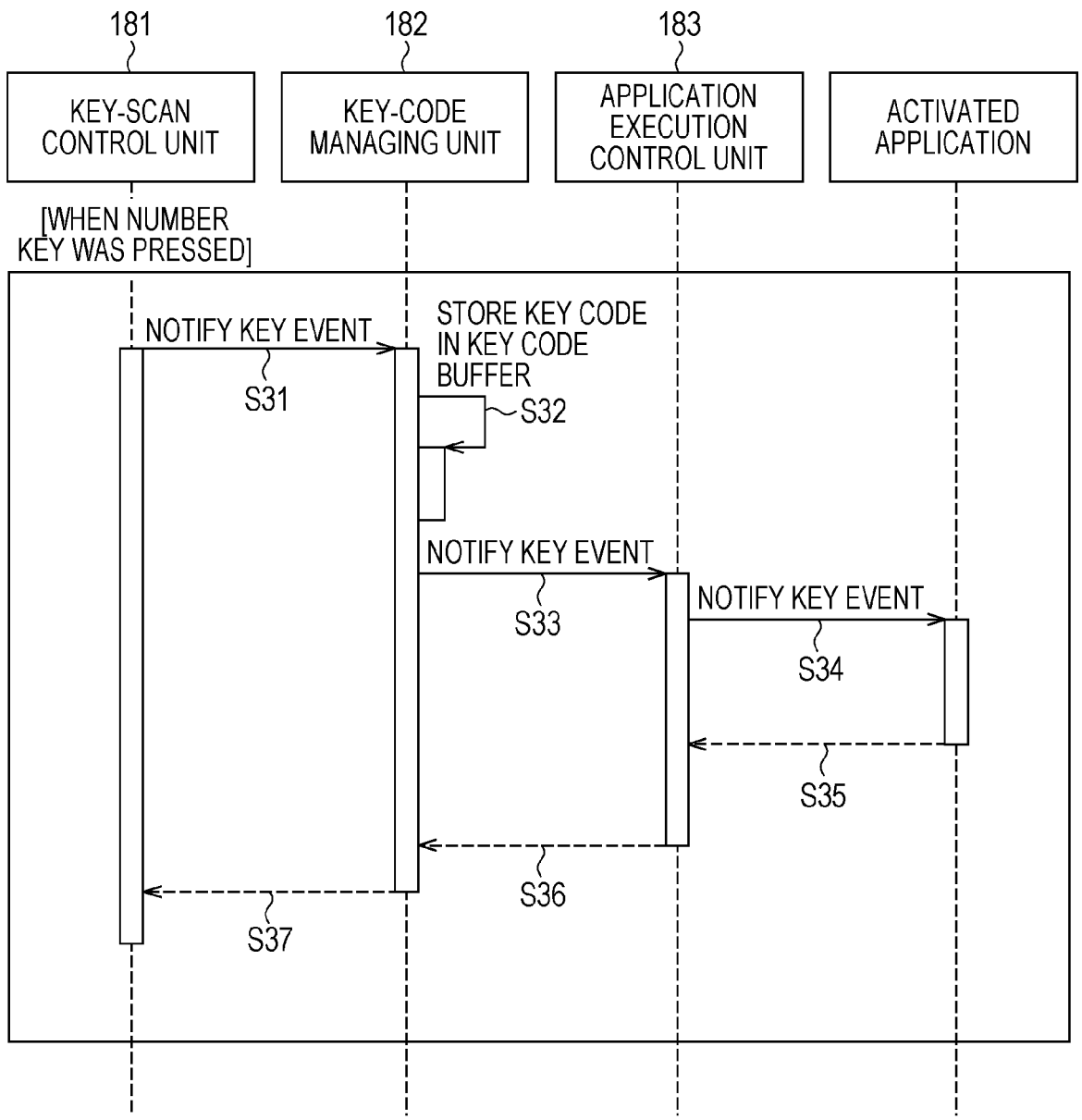

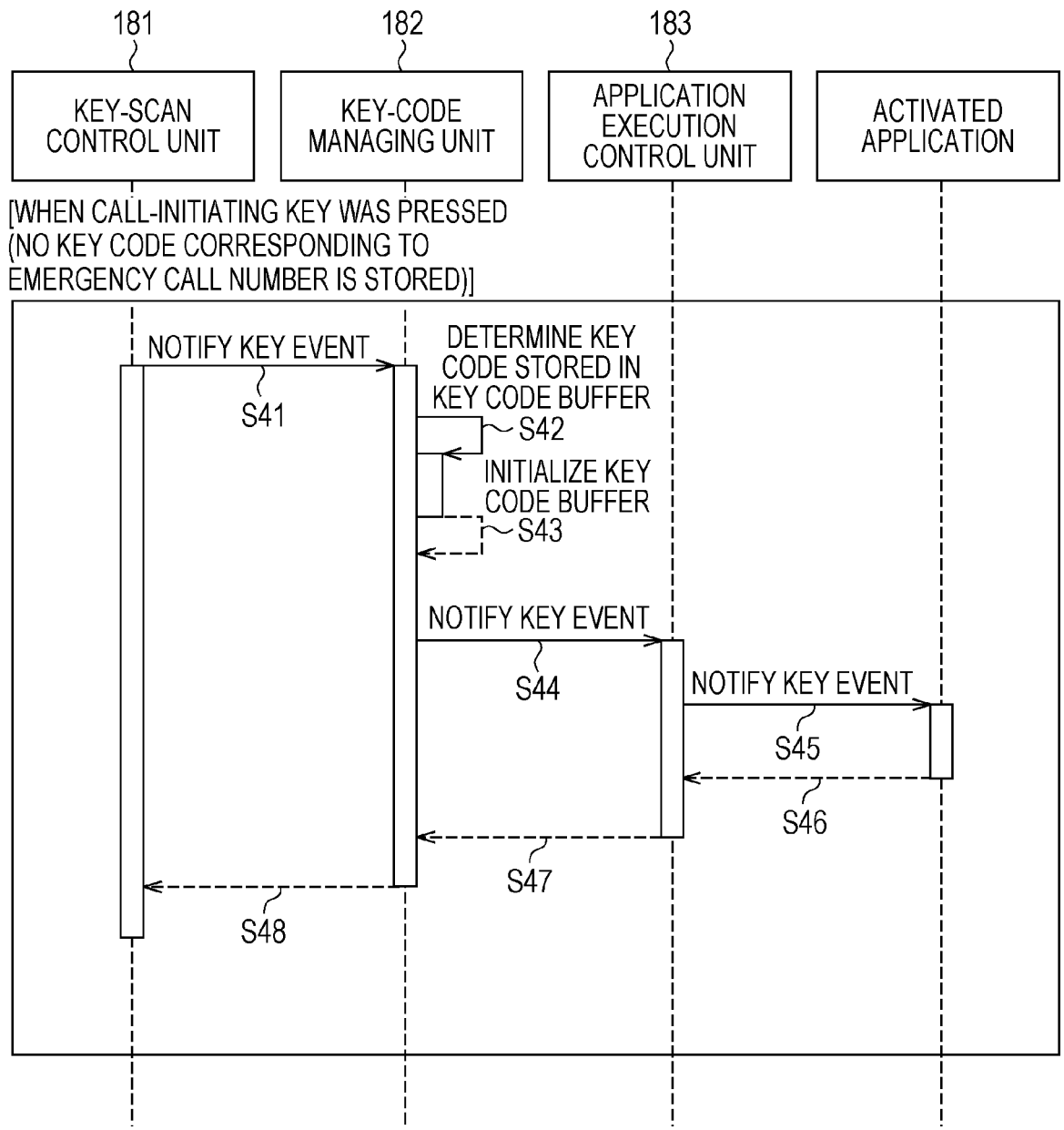

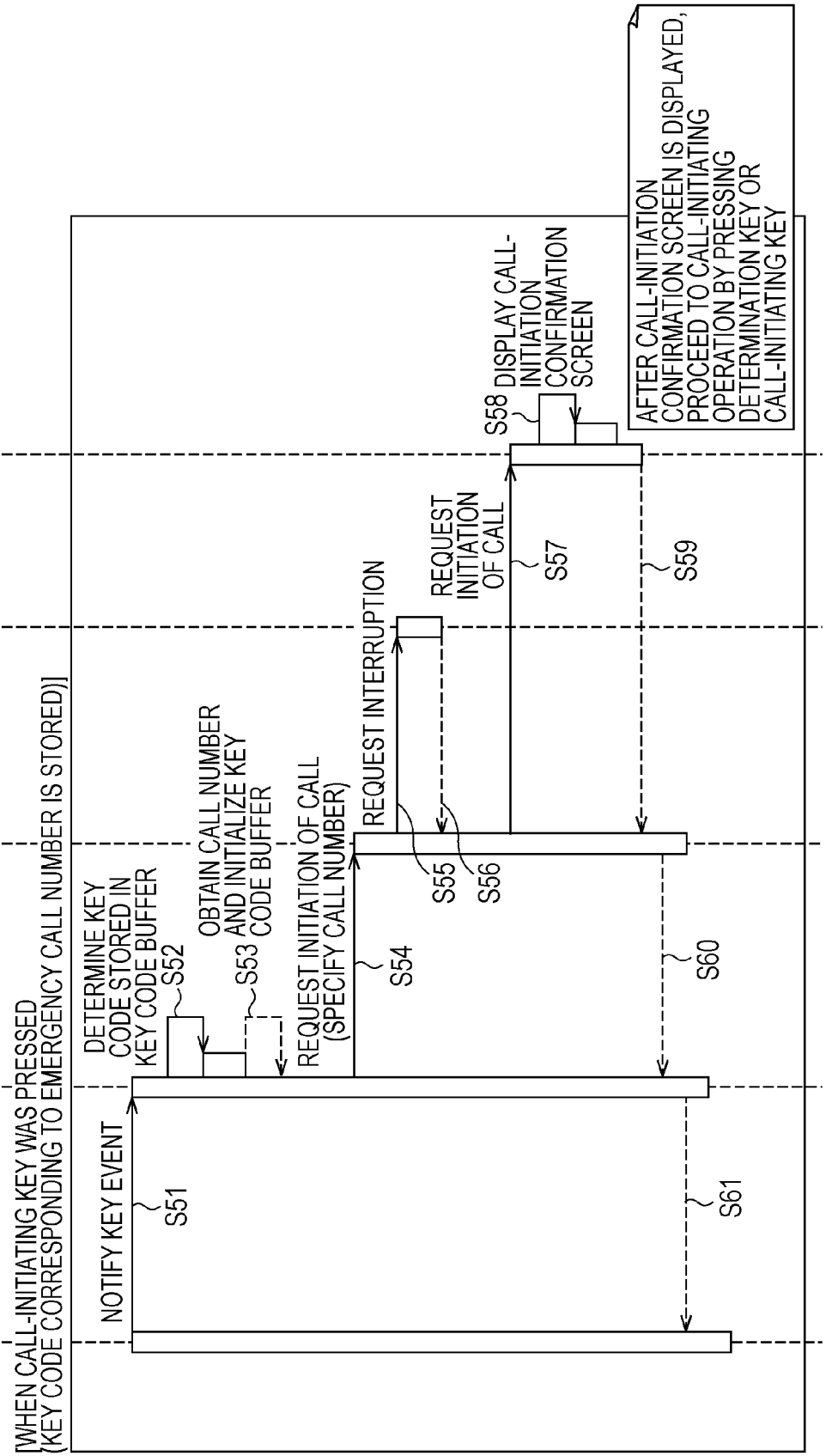

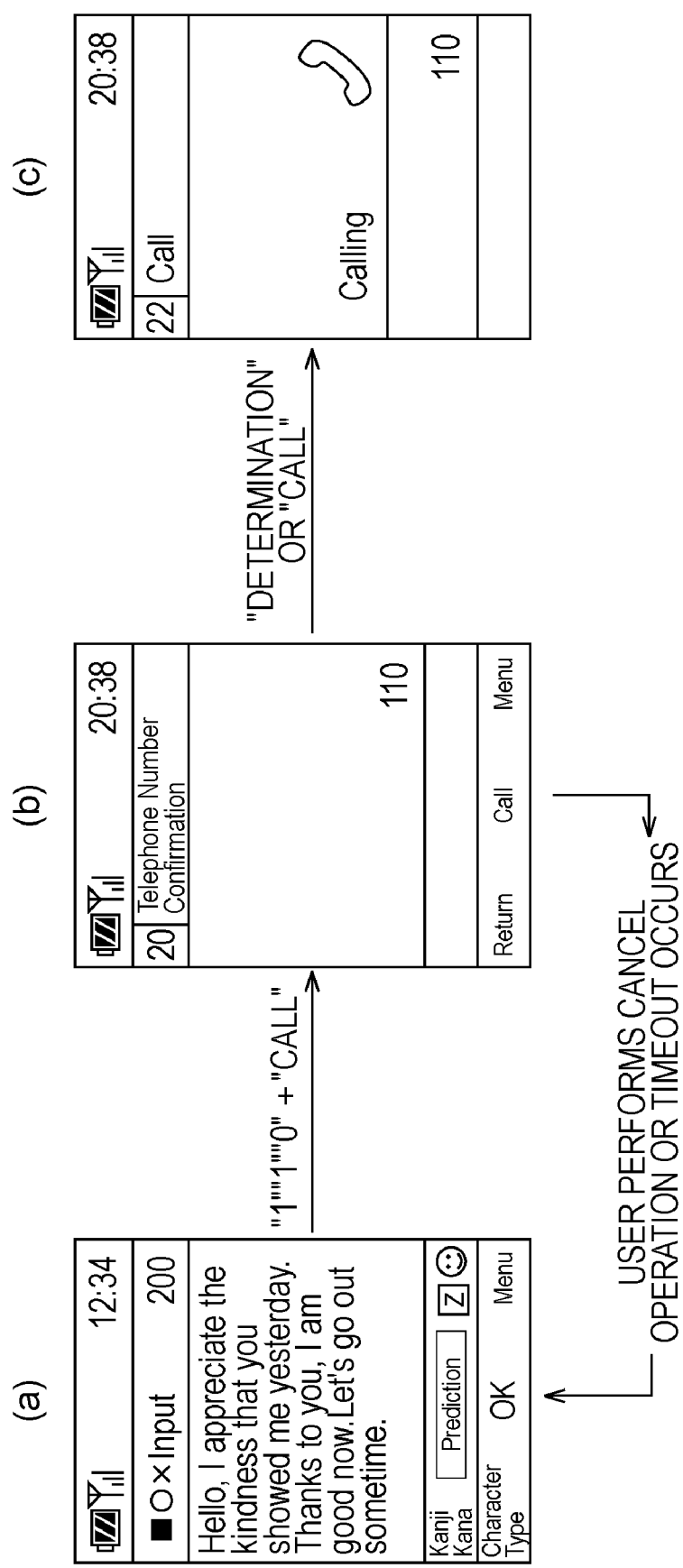

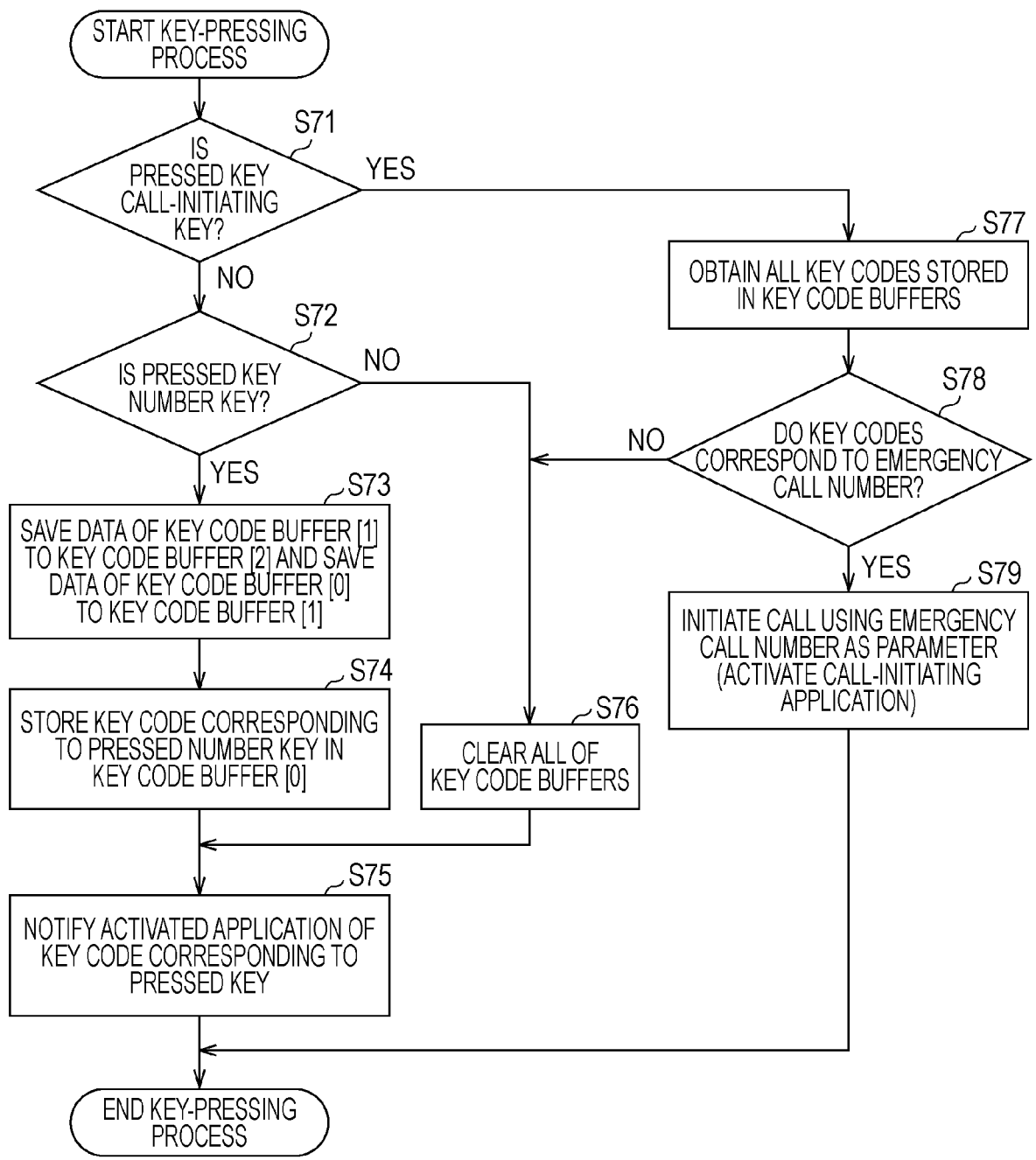

METHOD AND APPARATUS FOR CONTROLLING A MOBILE PHONE DEVICE

CROSS-REFERENCE TO RELATED APPLICATION

The present application claims priority under 35 U.S.C. §119 to Japanese Patent Application No. 2007-338305, filed Dec. 27, 2007, entitled "MOBILE PHONE DEVICE," the entirety of which is incorporated by reference herein.

BACKGROUND OF THE INVENTION

1. Field of the Invention

The present invention relates to a mobile phone device for initiating a predetermined call such as initiating an emergency call in the case of an emergency.

2. Description of the Related Art

The degree of importance of initiating an emergency call, such as making a police report, making a fire/ambulance report, or making a report to the Maritime Safety Agency (e.g., calling the numbers 110, 119 or 118, respectively, in Japan, or 911 in the United States), is higher than the degree of importance of initiating a call in a normal case.

However, in known mobile phone devices, only while a standby image is being displayed, an emergency call can be initiated.

The variety of mobile phone devices that have been developed recently has increased, and mobile phone devices today have multiple functions. Accordingly an operation that is necessary to be performed in a case of initiating a predetermined call, such as initiating an emergency call can be very complicated.

For this reason, it is desirable to have a mobile phone device whose operability and ease of use can be improved when initiating a predetermined call.

BRIEF SUMMARY OF THE INVENTION

The invention addresses the above and other needs by providing a multi-functional mobile phone device with improved operability and ease of use when initiating a call using a predetermined telephone number.

In one embodiment, the invention provides a mobile phone device that includes: a communication section configured to perform radio communication; an operation section including number keys and a call-initiating key; and a control section configured to activate, on the basis of an operation that is performed using the operation section, a call-initiating program or a non-call-initiating program, wherein, if the non-call-initiating program is activated, the control section determines if a call-initiating-key operation or a number-key operation was performed by a user, wherein, if it is determined that the number-key operation was performed, the control section performs a process using the non-call-initiating program on the basis of the number-key operation, and wherein, if it is determined that the call-initiating-key operation was performed, the control section determines whether one or more number keys that were operated before the call-initiating-key operation was performed corresponds to a predetermined call number, and, if it is determined that the one or more number keys correspond to the predetermined call number, the control section activates the call-initiating program, and controls the communication section to call the predetermined call number.

In a further embodiment, a communication control method includes the steps of: performing a first determination process of determining whether a call-initiating-key operation or a number-key operation was performed based on a key operation performed by a user when a non-call-initiating program is activated; performing, if it is determined in the first determination process that the number-key operation was performed, a process using the non-call-initiating program on the basis of the number-key operation, performing, if it is determined in the first determination process that the call-initiating-key operation was performed, a second determination process of determining whether one or more number keys selected immediately before the call-initiating-key operation was performed corresponds to a predetermined call number, and activating, if it is determined in the second determination process that the one or more number keys selected immediately before the call-initiating-key operation is performed corresponds to the predetermined call number, a call-initiating program that calls the predetermined call number.

In one embodiment, a "predetermined call number" can be any number desired by a user, programmer or manufacturer of the mobile phone device (e.g., "911" or other number), which is stored in a memory of the mobile phone device for purposes of facilitating making a call to the number in accordance with the invention described herein.

BRIEF DESCRIPTION OF THE DRAWINGS

The present disclosure, in accordance with one or more various embodiments, is described in detail with reference to the following Figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure.

FIG. 3 is a diagram showing a first key-event sequence that is performed in the mobile phone device according to one embodiment of the invention;

FIG. 4 is a diagram showing a second key-event sequence that is performed in the mobile phone device according to one embodiment of the invention;

FIG. 5 is a diagram showing a third key-event sequence that is performed in the mobile phone device according to one embodiment of the invention;

FIG. 6 illustrates a screen transition in which a call-initiation confirmation screen is displayed in the mobile phone device, according to one embodiment of the invention; and FIG. 7 is a flowchart of a key-event operation performed by the mobile phone device, according to one embodiment of the invention.

DESCRIPTION OF THE PREFERRED EMBODIMENTS

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

Figure 1:
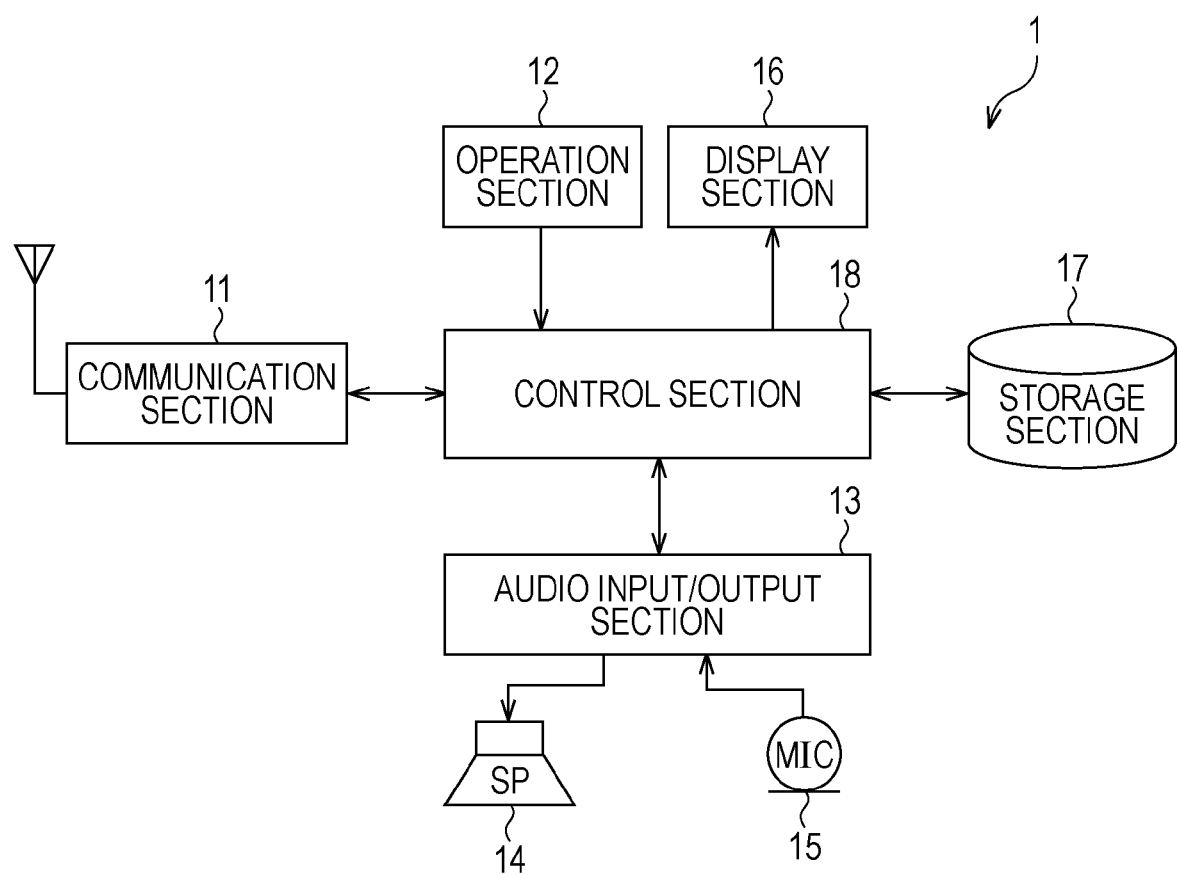
FIG. 1 is a block diagram showing an internal configuration of a mobile phone device according to one embodiment of the invention.

FIG. 1 is a block diagram showing an internal configuration of a mobile phone device according to an embodiment of the present invention. As shown in FIG. 1, a mobile phone device 1 includes a communication section 11, an operation section 12, an audio input/output section 13, a speaker 14, a microphone 15, a display section 16, a storage section 17, and a control section 18.

The communication section 11 supports a plurality of communication systems. For example, the communication section 11 performs, in accordance with CDMA2000 1x (hereinafter, simply referred to as "1x") or a communication protocol of evolution data only (EVDO), radio communication between the communication section 11 and a network-side device including a base station that is connected to a mobile communication network (not illustrated). EVDO communication is higher than 1x communication. The 1x communication has features such that it supports not only data communication but also audio communication, which is different from the EVDO communication.

The operation section 12 has keys to which various types of functions are assigned, and which include a power key, number keys, character keys, direction keys, a determination key, a call-initiating key, and so forth. When one of the keys is operated by a user so that an operation is performed, the operation section 12 generates a signal in accordance with the details of the operation, and inputs the signal as a user instruction to the control section 18.

The audio input/output section 13 performs processing on an audio signal that is to be output from the speaker 14, or on an audio signal that is input from the microphone 15. In other words, the audio input/output section 13 amplifies an audio signal that is input from the microphone 15, and performs analog-to-digital conversion on the audio signal. Furthermore, the audio input/output section 13 performs signal processing such as encoding on the audio signal. In this manner, the audio input/output section 13 converts the audio signal into digital audio data, and outputs the digital audio data to the control section 18. Additionally, the audio input/output section 13 performs decoding, digital-to-analog conversion, and signal processing such as amplification on audio data that is supplied from the control section 18. In this manner, the audio input/output section 13 converts the audio data into an analog audio signal, and outputs the analog audio signal to the speaker 14.

The display section 16 is configured using a display device, such as a liquid crystal display (LCD) panel or an organic electro-luminescence (EL) panel. Herein, an LCD module having embedded therein a random-access memory (RAM) 160 in which image data is stored is used as the display section 16. The display section 16 displays an image corresponding to an image signal that is supplied from the control section 18. More specifically, the display section 16 displays, for example, the following: a telephone number of a person or device being called when initiating a call with the mobile phone device 1; a telephone number of a person or device calling the mobile phone device 1; an incoming mail or an outgoing mail; a PICT image showing date, time, or remaining battery power; and a standby image.

The storage section 17 stores various types of data that is utilized in processing which is performed by the control section 18. For example, the storage section 17 stores, for example, the following: a program (hereinafter, referred to as an "application") that is executed by the control section 18; address-book data that is used to manage personal information such as telephone numbers or email addresses of communication partners; data concerning the history of initiated/received calls or sent/received mail; schedule data; audio files that are used to reproduce a ring tone or an alarm tone; data on various settings; and temporary data that is utilized in the course of operation of a program. Herein, the storage section 17 has a call-initiating application 172, which has an audio-call-initiating function using the communication section 11, and a non-call-initiating application 173, which does not have the audio-call-initiating function. When a key operation is performed using the operation section 12, key information identifying a key that was operated is also stored in the storage section 17. In one embodiment, a region in which the key information is stored is referred to as a key code buffer 171 included within the storage section 17.

The storage section 17 is configured using, for example, a non-volatile storage device (a flash memory), or a randomly accessible storage device (a static RAM (SRAM) or a dynamic RAM (DRAM)).

The control section 18 controls the overall operation of the mobile phone device 1. For example, the control section 18 controls operations (e.g., sending and receiving of signals with the communication section 11, and inputting and outputting of audio signals with the audio input/output section 13) of the above-described sections so that various types of processes (e.g., control for audio communication that is performed via a circuit switched network, control for generating, sending and receiving electronic mail, control for browsing the world wide web (www) sites on the Internet, and so forth) of the mobile phone device can be performed in accordance with input or key selections made by a user using the operation section 12. The control section 18 includes a computer (e.g., a microprocessor) that performs processes using programs (for example, an operating system, and applications) which are stored in the storage section 17, and performs the above-described processes in accordance with procedures that are realized using instructions in the programs. In other words, the control section 18 executes instructions provided by one or more application programs, which are stored in the storage section 17.

Furthermore, the control section 18 can execute the call-initiating application 172, which has the audio-call-initiating function using the communication section 11, and the non-call-initiating application 173, which does not have the audio-call-initiating function, on the basis of operations that are performed using the operation section 12. In one embodiment, the control section 18 can perform multiple functions simultaneously and/or in an interleaved fashion such that it appears to be multi-tasking. In a case in which an activated application is the non-call-initiating application 173, when an operation is performed using the operation section 12, the control section 18 performs a first process of determining which operation was performed, a call-initiating-key operation or a number-key operation. When it is determined that the number-key operation was performed, the control section 18 stores number-key information concerning a number key which was operated in the number-key operation in the key code buffer 171 of the storage section 17, and also performs control so that the number-key information is processed using the non-call-initiating application 173.

In contrast, when it is determined that the call-initiating-key operation was performed, the control section 18 performs a second process of determining whether or not number-key information that is stored in the key code buffer 171 corresponds to an emergency call number. When it is determined that the number-key information corresponds to an emergency call number, the control section 18 interrupts execution of the non-call-initiating application 173 (e.g., inactivates the non-call-initiating application 173). Additionally, the control section 18 activates the call-initiating application 172 so that the call-initiating application 172 is set to be in an activated state, and controls the communication section 11 to call the emergency call number. Further details of the flow of the above-described processes is described below, in accordance with one embodiment of the invention.

Figure 2:
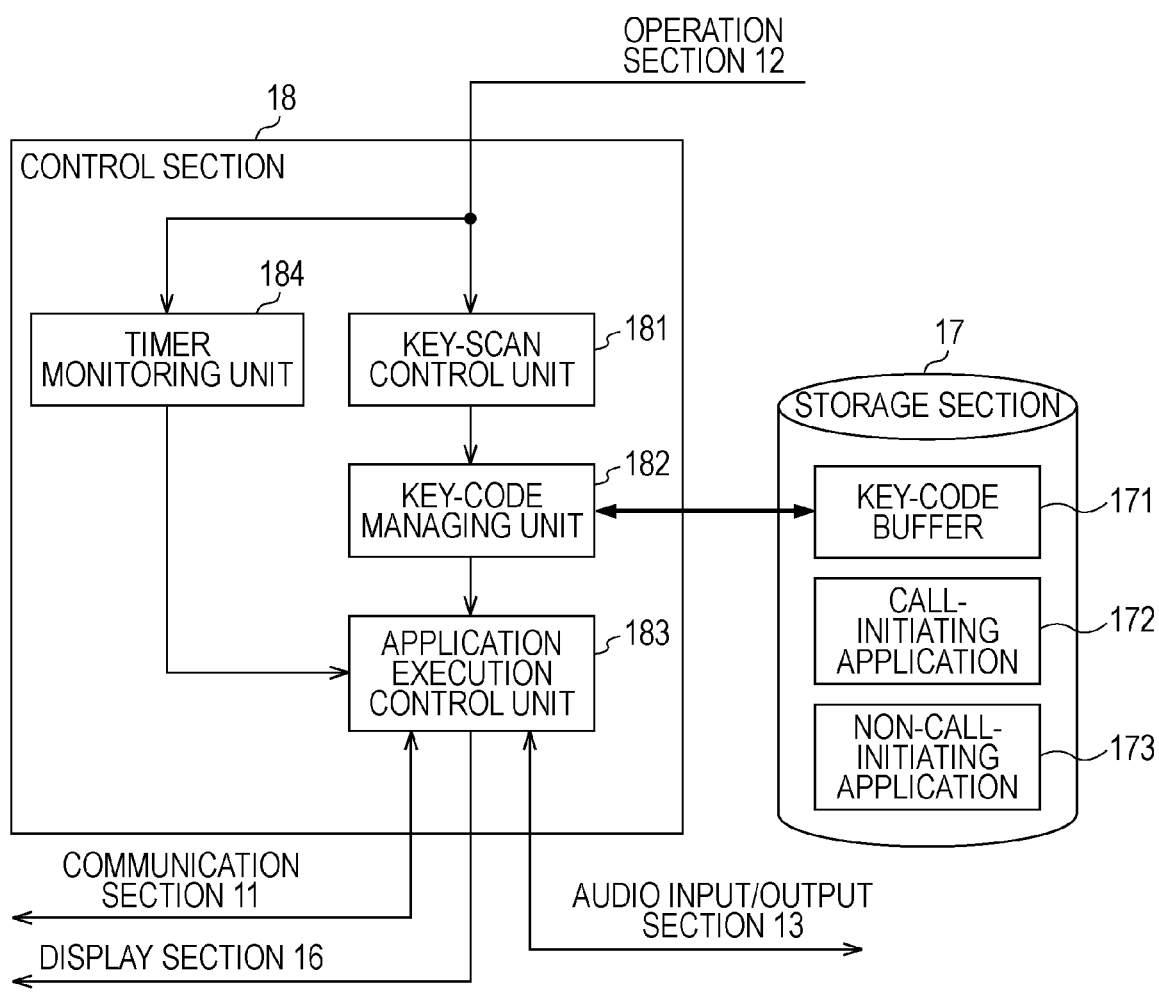
FIG. 2 is a block diagram of the control section shown in FIG. 1, in accordance with one embodiment of the invention.

FIG. 2 is a block diagram showing an internal configuration of the control section 18 shown in FIG. 1, in accordance with one embodiment of the invention. As shown in FIG. 2, the control section 18 includes a key-scan control unit 181, a key-code managing unit 182, an application execution control unit 183, and a timer monitoring unit 184.

The key-scan control unit 181 detects a key event by scanning keys including the number keys and the call-initiating key, which are assigned and arranged in the operation section 12, and passes coordinate data concerning a pressed key to the key-code managing unit 182. The key-code managing unit 182 converts the obtained coordinate data into a key code, and stores the key code in a key-code buffer 171. The key-code buffer 171 is assigned to a predetermined region of the storage section 17, and data is stored in the predetermined region serving as the key-code buffer 171. Additionally, the key-code managing unit 182 passes the key code to the application execution control unit 183.

In a case in which the activated program is the non-call-initiating application 173, when an operation is performed using the operation section 12, the application execution control unit 183 performs the process of determining which operation was performed, the call-initiating-key operation or the number-key operation. When it is determined that the number-key operation was performed, the application execution control unit 183 stores number-key information concerning a number key that was operated in the key-code buffer 171 of the storage section 17, and thereafter performs control functions so that the number-key information is processed using the non-call-initiating application 173. When it is determined that the call-initiating-key operation was performed, the application execution control unit 183 performs the process of determining whether or not number-key information that is stored in the key-code buffer 171 of the storage section 17 corresponds to an emergency call number. When it is determined that the number-key information corresponds to an emergency call number, the application execution control unit 183 interrupts execution of the non-call-initiating application 173, activates the call-initiating application 172, and controls the communication section 11 to call the emergency call number.

The application execution control unit 183 controls timing for initialization of the key-code buffer 171, which is assigned to a predetermined region of the storage section 17, so that an operation error using the call-initiating key can be avoided when number-key information corresponding to an emergency call number is not stored in the key-code buffer 171. In one embodiment, when it is determined that number-key information stored in the key-code buffer 171 does not correspond to any emergency call number, the application execution control unit 183 erases the number-key information that is stored in the key-code buffer 171. In a further embodiment, if it is determined that an operation other than the call-initiating-key operation and the number-key operation was performed, the application execution control unit 183 erases number-key information that is stored in the key-code buffer 171. Furthermore, when the non-call-initiating application 173 is activated, if no operation using the operation section 12 is performed for a predetermined period of time while the timer monitoring unit 184 is monitoring a timer, the application execution control unit 183 erases number-key information that is stored in the key-code buffer 171.

In one embodiment, the application execution control unit 183 activates the call-initiating application 172, and confirms whether or not initiation of a call is to be performed before an emergency number is called. When an operation using the operation section 12 indicates that initiation of a call is to be performed, the application execution control unit 183 initiates a call with the communication section 11. In contrast, when an operation indicates that initiation of a call is not to be performed, or when no operation is performed for a predetermined period of time while the timer monitoring unit 184 is monitoring the timer, the application execution control unit 183 does not initiate a call, and erases number-key information that is stored in the key-code buffer 171. In a further embodiment, the application execution control unit 183 terminates execution of the call-initiating application 172, and also activates the non-call-initiating application 173 that was in an inactivated state.

FIGS. 3 to 5 are diagrams showing three key-event sequences executed by the mobile phone device, according to various embodiments of the invention. FIG. 3 shows a first key-event sequence that is performed when a number key is pressed. FIG. 4 shows a second key-event sequence that is performed when the call-initiating key is pressed in a state in which a key code corresponding to an emergency call number is not stored in the key-code buffer 171. FIG. 5 shows a third key-event sequence that is performed when the call-initiating key is pressed in a state in which a key code corresponding to an emergency call number is stored in the key-code buffer 171.

In the first key-event sequence shown in FIG. 3, when a user presses a "number key" that is assigned and arranged at any given position in the operation section 12, the key-scan control unit 181 performs a scan operation, thereby detecting a key event that is performed by the pressed number key so that coordinate data concerning the number key is obtained. The key-scan control unit 181 passes the coordinate data concerning the number key, which is obtained using the scan operation, to the key-code managing unit 182 (step S31). The key-code managing unit 182 ensures a region to which the key-code buffer 171 is assigned in the storage section 17, and converts the coordinated data, which is obtained from the key-scan control unit 181, into a key code by using a conversion table, which is embedded in the key-code managing unit 182. The key-code managing unit 182 then stores the key code that is obtained by using the conversion table in the designated location or region of key-code buffer 171, which is ensured in advance (step S32).

Then, the key-code managing unit 182 notifies the application execution control unit 183 of the key event indicated by the key code corresponding to the number key, which is stored in the key-code buffer 171 (step S33). The application execution control unit 183 passes the key event to an application (e.g., the non-call-initiating application 173 or the call-initiating application 172), which is in an activated state (step S34). Accordingly, the activated call-initiating application 172 or the activated non-call-initiating application 173 can recognize which number key (e.g., one corresponding to an emergency call number) was pressed. Note that, in FIG. 3, dashed arrows correspond to responses from the activated application (e.g., the call-initiating application 172 or the non-call-initiating application 173), the application execution control unit 183, and the key-code managing unit 182 when the key event is successfully obtained (steps S35 to S37).

In the second key-event sequence shown in FIG. 4, when the user presses the "call-initiating key", which is assigned and arranged at any given position in the operation section 12, the key-scan control unit 181 performs a scan operation, thereby detecting a key event that is performed by the pressed call-initiating key, and notifies the key-code managing unit 182 of the key event (step S41). When the key-code managing unit 182 receives the notification of the key event, the key-code managing unit 182 refers to a key code that is stored in the key-code buffer 171, and determines whether or not the key code that is stored in the key-code buffer 171 corresponds to an emergency call number (step S42). If the key code does not correspond to any emergency call number, the key-code managing unit 182 initializes the key-code buffer 171 (step S43). Then, the key-code managing unit 182 notifies the application execution control unit 183 of the key event (step S44). The application execution control unit 183 passes the key event to an application (e.g., the non-call-initiating application 173 or the call-initiating application 172), which is in an active state (step S45).

In FIG. 4, dashed arrows correspond to responses from the activated application (e.g., the call-initiating application 172 or the non-call-initiating application 173), the application execution control unit 183, and the key-code managing unit 182 (steps S46 to S48) when the key event is successfully obtained. Accordingly, even in a case in which the call-initiating key is pressed, when a key code that is stored in the key-code buffer 171 does not correspond to any emergency call number, the key-code managing unit 182 initializes the key-code buffer 171, so that an operation error can be avoided.

In the third key-event sequence shown in FIG. 5, when a user presses the "call-initiating key," which is assigned and arranged at any given position in the operation section 12, the key-scan control unit 181 performs a scan operation, thereby detecting a key event that is performed by the pressed call-initiating key, and notifies the key-code managing unit 182 of the key event (step S51). When the key-code managing unit 182 receives the notification of the key event, the key-code managing unit 182 refers to a key code that is stored in the key-code buffer 171, and determines whether or not the key code that is stored in the key-code buffer 171 corresponds to an emergency call number (step S52). If the key code that is stored in the key-code buffer 171 corresponds to an emergency call number, the key-code managing unit 182 obtains the emergency call number, and initializes the key-code buffer 171 (step S53).

Then, the key-code managing unit 182 sends a call-initiation request in which the obtained emergency call number is specified to the application execution control unit 183 (step S54). The application execution control unit 183, which has received the call-initiation request from the key-code managing unit 182, sends an interruption request to an activated application (e.g., the non-call-initiating application 173) (step S55). In addition, the application execution control unit 183 receives a response indicating that an interruption process has finished from the non-call-initiating application 173 (step S56), and sends the call-initiation request to the call-initiating application 172 (step S57). The call-initiating application 172, which has received the call-initiation request from the application execution control unit 183, generates a call-initiation screen, one example of which is shown in part (b) of FIG. 6, and displays the call-initiating screen on the display section 16. The process of the call-initiating application 172 waits until the user presses the call-initiating key or the determination key, and then proceeds to a call-initiation operation (step S58). Note that, in FIG. 5, dashed arrows that are used in step S58 or later steps correspond to responses from the call-initiating application 172, the application execution control unit 183, and the key-code managing unit 182 which notify each unit that the process of the call-initiating application 172 has proceeded to the call-initiation operation (steps S59 to S61).

FIG. 6 illustrates various screen shots displayed by the mobile phone device, according to one embodiment of the invention. Part (a) of FIG. 6 shows a mail creation screen. The mail creation screen is displayed on the display section 16 (FIG. 1) when a mail application, which is a non-call-initiating application, is activated. In the exemplary scenario of FIG. 6, it is supposed that a request for making a police report (e.g., calling the number 110) is made while the mail creation screen shown in part (a) of FIG. 6 is being displayed. In such a case, number keys "1", "1", and "0", and the call-initiating key are pressed by a user, and the screen is changed from the mail creation screen to a call-initiation screen shown in part (b) of FIG. 6. In this case, when the user looks at the call-initiation screen and presses the call-initiating key or the determination key, the screen is changed to a screen shown in part (c) of FIG. 6, so that the process of the operation of the mobile phone device proceeds to an actual call-initiating operation.

While the mail creation screen shown in part (b) of FIG. 6 is being displayed, when a cancel operation is performed by the user or when a timeout indicating that no operation is performed for a fixed period of time is detected, the non-call-initiating application 173 that was originally activated is activated, whereby the screen is changed back to the mail creation screen shown in part (a) of FIG. 6.

In one embodiment, the control section 18 (e.g., the application execution control unit 183) activates the call-initiating application 172, and confirms whether or not initiation of a call is to be performed before an emergency number is called. When an operation indicating that initiation of a call is to be performed, based on a user's use of the operation section 12, the control section 18 (e.g., the application execution control unit 183) initiates a call with the communication section 11. When an operation indicating that initiation of a call is not to be performed, or if no operation is performed for a predetermined period of time or longer, the control section 18 (e.g., the application execution control unit 183) does not initiate a call, and erases number-key information that is stored in the key-code buffer 171 of the storage section 17. In addition, the control section 18 (e.g., the application execution control unit 183) terminates execution of the call-initiating application 172, and activates the non-call-initiating application 173 that was interrupted. Note that, the control section 18 includes the timer monitoring unit 184 in order to monitor whether no operation is performed for a predetermined time. Also, when the timer monitoring unit 184 detects a timeout, the control section 18 initializes the key-code buffer 171, and restarts the non-call-initiating application 173.

As described above, when an emergency call is to be initiated, the call-initiation screen is displayed before the emergency call is initiated. The process waits until the call-initiating key or the determination key is pressed by the user while the call-initiation screen is being displayed, and then proceeds to the call-initiation operation, so that an error or misdial can be avoided. Furthermore, while the call-initiation screen is being displayed, when a cancel operation is performed or when no operation is performed for a fixed time, an application that was originally activated can be restarted. Thus, convenience is not decreased.

FIG. 7 is a flowchart showing a key-event process executed by the mobile phone device according to one embodiment of the invention. In this embodiment, the key-code buffer 171 includes three key code buffers, namely, key code buffers #0, #1, and #2.

When the control section 18 (e.g., the application execution control unit 183) receives a key event, e.g., a key code, from the key-code managing unit 182, first, the control section 18 determines whether or not a pressed key corresponding to the received key code is a call-initiating key (step S71). If it is determined in step S71 that the pressed key corresponding to the received key code is not the call-initiating key (NO in step S71), the application execution control unit 183 further determines whether or not the pressed key is a number key (step S72). If it is determined in step S72 that the pressed key is a number key (YES in step S72), the application execution control unit 183 saves a key code that is stored in the key code buffer #1 to the key code buffer #2, and saves a key code that is stored in the key code buffer #0 to the key code buffer #1 (step S73). Then, the application execution control unit 183 stores the key code corresponding to the pressed number key in the key code buffer #0 (step S74). In other words, the application execution control unit 183 performs first-in first-out (FIFO) control for the key-code buffers 0, 1 and 2 of buffer 171. Then, the application execution control unit 183 notifies an activated application, which is in an activated state, of the key code corresponding to the pushed key, which is stored in the key-code buffer 171 (step S75).

If it is determined in the process of step S72 that the pressed key is not any number key (No in step S72), the application execution control unit 183 erases all key codes that are stored in the key-code buffer 171 (step S76). Then, the application execution control unit 183 notifies the activated non-call-initiating application 173, which is in the activated state, of a key code corresponding to the pressed key, and terminates the key-pressing process (step S75).

In contrast, if it is determined in the process of step S71 that the pressed key corresponding to the key code which has been received from the key-code managing unit 182 is the call-initiating key (YES in step S71), the application execution control unit 183 obtains three key codes that are stored in the key-code buffer 171 (step S77), and determines whether or not the key codes correspond to an emergency call number (step S78). In step S78, if it is determined that the key codes correspond to an emergency call number, such as the number 110, the number 119, or the number 118, (Yes in step S78), the application execution control unit 183 activates the call-initiating application 172, issues an instruction for the call-initiating operation using the emergency call number, and terminates the key-pressing process (step S79). Note that, if it is determined that the key codes do not correspond to any emergency call number (No in step S78), the application execution control unit 183 erases all key codes that are stored in the key-code buffer 171 (step S76). Then, the application execution control unit 183 notifies the activated non-call-initiating application 173, which is in the activated state, of the key code corresponding to the non-call-initiating key, and issues a request for the non-call-initiating application 173 to handle or process the event associated with the key code. The application execution control unit 183 then terminates the key-pressing process (step S75).

In other words, if the activated program is the non-call-initiating application 173, based on an operation performed using the operation section 12, the control section 18 (e.g., the application execution control unit 183) performs the first process of determining which operation was performed, the call-initiating-key operation or the number-key operation (steps S71 and S72). When it is determined in the first process that the number-key operation was performed (YES in step S72), the control section 18 stores number-key information (e.g., a key code) associated with a number key in the key-code buffer 171 of the storage section 17 (steps S73 and S74), and also performs control so that the number-key information is processed using the non-call-initiating application 173 (step S75). If it is determined that the call-initiating-key operation was performed (YES in step S71), the control section 18 performs the second process of determining whether or not number-key information that is stored in the key-code buffer 171 of the storage section 17 corresponds to an emergency call number (step S78). If it is determined in the second process that the number-key information that is stored in the key-code buffer 171 of the storage section 17 corresponds to an emergency call number (YES in step S78), the control section 18 interrupts execution of the non-call-initiating application 173, and activates the call-initiating application 172. The control section 18 then operates so that it controls the communication section 11 to call the emergency call number (step S79).

If it is determined in the second step (step S78) that the number-key information that is stored in the key-code buffer 171 of the storage section 17 does not correspond to any emergency call number (No in step S78), the control section 18 operates so that it erases the number-key information which is stored in the key-code buffer 171 of the storage section 17 (step S76).

The control section 18 monitors, with the timer monitoring unit 184, a time for which no operation using the operation section 12 is performed by the user. If the non-call-initiating application 173 is activated, and no operation using the operation section 12 is performed for a predetermined period of time, the control section 18 may erase number-key information that is stored in the key-code buffer 171 of the storage section 17. Accordingly, the user can erase, without being bothered, data that is stored in the key-code buffer 171, and can initiate an emergency call in the case of emergency.

In one embodiment, even if a non-call-initiating application 173 that does not have the call-initiating function, such as a game application, a navigation application, an application for digital terrestrial television broadcasting, a standby application, or a telephone-book application, for example, is executed, the user can initiate an emergency call without being bothered. Additionally, convenience is not decreased. Furthermore, in one embodiment, when the user initiates an emergency call, the call-initiation screen is displayed before the emergency call is initiated. The process of the call-initiating operation waits until the call-initiating key or the determination key is pressed by the user while the call-initiation screen is being displayed, and then proceeds to the call-initiating operation, so that an error or misdial can be avoided. Furthermore, while the call-initiation screen is being displayed, when a cancel operation is performed or when no operation is performed for a fixed time, an interrupted application that was originally activated can be restarted. Thus, convenience is not decreased.

Furthermore, if it is determined that number-key information does not correspond to any emergency call number, or if it is determined that an operation other than the call-initiating-key operation and the number-key operation was performed, or if no operation using the operation section 12 is performed for a predetermined period of time when the call-initiating application 172 is activated, the number-key information that is stored in the key-code buffer 171 of the storage section 17 is erased. Thus, an emergency call can be immediately initiated in the case of an emergency.

All of the functions of the units and sections included in the mobile phone device (e.g., the control section 18) shown in FIG. 2 may be realized by using software, firmware, hardware or any combination of these technologies as would be apparent to those of skill in the art. For example, data processing that is performed by the key-scan control unit 181, the key-code managing unit 182, the application execution control unit 183, and the timer monitoring unit 184, which are included in the control section 18, may be realized using one program or a plurality of programs on a computer. Furthermore, at least one portion of the data processing may be realized using hardware. Moreover, in one embodiment, the key-code buffer 171 may be assigned to a predetermined region of the storage section 17, wherein data is stored in the predetermined region serving as the key-code buffer 171.

In the above-described embodiment, if it is determined in the second process that number-key information which is stored in the storage section 17 corresponds to an emergency call number, the control section 18 calls the emergency call number (steps S78 and S79 shown in FIG. 7). However, the present invention is not limited to this embodiment. For example, the emergency number may be called in a configuration in which the storage section 17 does not have a function of storing number-key information. More specifically, the control section 18 causes the display section 16 to display information corresponding to number keys that have been pressed (the storage section 17 does not have a function of storing the information). When the displayed information corresponds to an emergency call number, the emergency call number is called.

Furthermore, in the above-described embodiment, an emergency call number (such as the number 110 or the number 119) corresponds to a predetermined call number. However, the present invention is not limited to this embodiment. For example, the predetermined call number may be a telephone number that is stored as data in an address book, or an address number (which corresponds to a telephone number). Accordingly, the number of digits of the predetermined call number is not limited to three (the number 110 or the like). Furthermore, the number of digits of the predetermined call number may be one.

Although exemplary embodiments of the present invention have been described with reference to the accompanying drawings in the above, it is understood that the present invention is not limited to the above-described embodiments. Various alterations and modifications to the above embodiments are contemplated to be within the scope of the invention. It should be understood that those alterations and modifications are included in the technical scope of the present invention as defined by the appended claims.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A mobile phone device, comprising:
a communication section configured to perform radio communication;
an operation section including number keys and a call-initiating key; and
a control section configured to activate, on the basis of an operation that is performed using the operation section, a call-initiating program or a non-call-initiating program,
wherein, if the non-call-initiating program is activated, the control section determines if a call-initiating-key operation or a number-key operation was performed by a user,
wherein, if it is determined that the number-key operation and the call-initiating key operation were performed while the non-call-initiating program is activated,
the control section determines whether one or more number keys that were operated correspond to a predetermined call number, and, if it is determined that the one or more number keys correspond to the predetermined call number, the control section activates the call-initiating program, and controls the communication section to call the predetermined call number.

2. The mobile phone device according to claim 1, further comprising a storage section configured to store number-key information identifying one or more number keys selected by a user using the operation section,
wherein, if it is determined that the number-key operation was performed, the control section stores, in the storage section, number-key information concerning the one or more selected number keys and performs a process using the non-call-initiating program in accordance with the number-key information, and
wherein, if it is determined that the call-initiating-key operation was performed, the control section determines whether number-key information that is stored in the storage section corresponds to the predetermined call number.

3. The mobile phone device according to claim 1, wherein the predetermined call number is an emergency call number.

4. The mobile phone device according to claim 2, wherein, if it is determined that the number-key information which is stored in the storage section corresponds to the predetermined call number, the control section interrupts execution of the non-call-initiating program, activates the call-initiating program, and controls the communication section to call the predetermined call number.

5. The mobile phone device according to claim 2, wherein, if it is determined that the number-key information which is stored in the storage section does not correspond to the predetermined call number, the control section erases the number-key information which is stored in the storage section.

6. The mobile phone device according to claim 2, wherein, if it is determined that an operation other than the call-initiating-key operation and the number-key operation was performed, the control section erases the number-key information that is stored in the storage section.

7. The mobile phone device according to claim 2,
wherein the control section activates the call-initiating program, and confirms whether or not initiation of a call is to be performed before the predetermined call number is called,
wherein, if it is determined that the initiation of a call is to be performed, the control section initiates a call with the communication section, and
wherein, if it is determined that the initiation of a call is not to be performed, or no operation is performed for a predetermined period of time, the control section erases the number-key information that is stored in the storage section without performing the initiation of a call, terminates execution of the call-initiating program, and reactivates the non-call-initiating program that was interrupted.

8. The mobile phone device according to claim 2, wherein, when the non-call-initiating program is activated, if no operation using the operation section is performed for a predetermined period of time, the control section erases the number-key information that is stored in the storage section.

9. A method of controlling a communication device comprising the steps of:
performing a first determination process of determining whether a call-initiating-key operation or a number-key operation was performed based on a key operation performed by a user when a non-call-initiating program is activated;
performing, if it is determined in the first determination process that the number-key operation and the call-initiating-key operation were performed while the non-call-initiating program is activated,
a second determination process of determining whether one or more number keys selected correspond to a predetermined call number, and
activating, if it is determined in the second determination process that the one or more number keys selected immediately before the call-initiating-key operation is performed corresponds to the predetermined call number, a call-initiating program that calls the predetermined call number.

10. The method of claim 9 further comprising, if it is determined that the number-key information does not correspond to the predetermined call number, erasing the number-key information from a memory of the communication device.

11. The method of claim 9 further comprising, if it is determined that an operation other than the call-initiating-key operation and the number-key operation was performed, erasing the number-key information from a memory of the communication device.

12. The method of claim 9 further comprising:
activating the call-initiating program;
confirming whether initiation of a call is to be performed before the predetermined call number is called;
initiating a call if it is determined that the initiation of a call is to be performed;
erasing the number key information if it is determined that the initiation of a call is not to be performed, or no operation is performed for a predetermined period of time;
terminating execution of the call-initiating program; and
reactivating the non-call-initiating program that was interrupted.

13. The method of claim 9 further comprising, if the non-call-initiating program is activated, and if no operation using the operation section is performed for a predetermined period of time, erasing the number-key information from a memory of the communication device.

* * * * *